United States Patent
Thomsen et al.

(10) Patent No.: US 12,297,805 B2
(45) Date of Patent: May 13, 2025

(54) YAW SUPERVISION

(71) Applicant: VESTAS WIND SYSTEMS A/S, Aarhus N. (DK)

(72) Inventors: Keld Thomsen, Fårup (DK); Claus T. S. Andreasen, Aarhus C (DK); Carsten Krogh Nielsen, Hammel (DK); Sanath Kumar Sathish, Chennai (IN)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 90 days.

(21) Appl. No.: 17/786,430

(22) PCT Filed: Dec. 11, 2020

(86) PCT No.: PCT/DK2020/050350
§ 371 (c)(1),
(2) Date: Jun. 16, 2022

(87) PCT Pub. No.: WO2021/121499
PCT Pub. Date: Jun. 24, 2021

(65) Prior Publication Data
US 2023/0014873 A1   Jan. 19, 2023

(30) Foreign Application Priority Data
Dec. 16, 2019   (DK) ............... PA 2019 70771

(51) Int. Cl.
*F03D 17/00* (2016.01)
*F03D 7/02* (2006.01)
(Continued)

(52) U.S. Cl.
CPC ........... *F03D 17/00* (2016.05); *F03D 7/0204* (2013.01); *F03D 7/043* (2013.01); *F03D 17/013* (2023.08);
(Continued)

(58) Field of Classification Search
CPC ........ F03D 17/00; F03D 7/0204; F03D 7/043; F03D 17/013; F03D 17/014;
(Continued)

(56) References Cited

U.S. PATENT DOCUMENTS

| 4,815,936 A | * | 3/1989 | Stoltze | F03D 7/0212 |
| | | | | 416/41 |
| 2012/0134807 A1 | * | 5/2012 | Axelsson | F03D 7/0224 |
| | | | | 416/1 |

(Continued)

FOREIGN PATENT DOCUMENTS

| CN | 104454345 A | 3/2015 |
| CN | 106922162 A | 7/2017 |

(Continued)

OTHER PUBLICATIONS

PCT, International Search Report for Application PCT/DK2020/050350 dated Feb. 3, 2021.

(Continued)

*Primary Examiner* — Christopher Verdier
*Assistant Examiner* — Arthur Paul Golik
(74) *Attorney, Agent, or Firm* — Patterson + Sheridan, LLP (57) ABSTRACT

The invention relates to a method for monitoring yawing fault events of a yaw system of a wind turbine. The yaw system comprises one or more actuators for driving the yaw system and a holding system to resist yaw rotation. The yaw system is arranged to provide yaw rotation in response to a yaw control signal. According to the method, the monitored yaw angle is compared with the yaw control signal, and based on the comparison, a correlation between a monitored change in the yaw angle and the yaw control signal is determined. A yawing fault event is determined dependent on the determined correlation.

11 Claims, 5 Drawing Sheets

(51) Int. Cl.
    *F03D 7/04* (2006.01)
    *F03D 80/50* (2016.01)

(52) U.S. Cl.
    CPC .......... *F03D 17/014* (2023.08); *F03D 17/029* (2023.08); *F03D 80/50* (2016.05); *F03D 80/509* (2023.08); *F05B 2230/80* (2013.01); *F05B 2270/329* (2013.01)

(58) Field of Classification Search
    CPC ...... F03D 17/029; F03D 80/50; F03D 80/509; F05B 2270/329; F05B 2270/802; F05B 2230/80
    See application file for complete search history.

(56) References Cited

U.S. PATENT DOCUMENTS

| | | | |
|---|---|---|---|
| 2017/0241409 A1* | 8/2017 | Kjær | F03D 9/257 |
| 2018/0187646 A1* | 7/2018 | Arlaban Gabeiras | F03D 7/0224 |

FOREIGN PATENT DOCUMENTS

| | | |
|---|---|---|
| CN | 107131012 A | 9/2017 |
| CN | 107152374 A | 9/2017 |
| CN | 108457798 A | 8/2018 |
| CN | 108561274 A | 9/2018 |
| EP | 2860392 A1 | 4/2015 |
| WO | 2016008500 A1 | 1/2016 |
| WO | 2018177615 A1 | 10/2018 |
| WO | 2021121499 A1 | 6/2021 |

OTHER PUBLICATIONS

PCT, Written Opinion Of The International Searching Authority for Application PCT/DK2020/050350 dated Feb. 3, 2021.
Chinese Patent Office, First Office Action for Chinese Patent Application No. 202080091797.4, dated May 8, 2024.
Chinese Patent Office, Second Office Action for Chinese Patent Application No. 202080091797.4, dated Oct. 29, 2024.
Office Action received for European Patent Application No. 20828018.0, mailed on Feb. 13, 2025, 6 pages.

* cited by examiner

YAW SUPERVISION

FIELD OF THE INVENTION

The invention relates to yaw systems in wind turbines, particularly to monitoring the health of such yaw systems.

BACKGROUND OF THE INVENTION

The function of the yaw system in wind turbines is to yaw the rotor of the wind turbine upwind and to hold the upwind orientation.

The yaw system has a holding system such a yaw friction bearing, a brake system or other holding mechanism which is responsible for holding the rotor of the wind turbine upwind during periods where the yaw angle is not adjusted.

Situations may occur where the holding moment of the holding system fails to hold the nacelle and where the wind turbine nacelle is forced out of the desired yaw orientation, e.g. due to wind gusts. In such situations, the yaw system will be activated to bring the nacelle and rotor back to the upwind orientation. During the period where yaw angle deviates from the correct yaw angle there is a loss of energy production and there is a risk of mechanical overload of the load carrying components of the wind turbine.

Thus, there is a need for reducing occurrences where the wind turbine nacelle is forced out of the desired yaw orientation. Therefore, improvements of the yaw system or improvements of the yaw system supervision is needed to improve the reliability of the holding system of the yaw system.

SUMMARY OF THE INVENTION

It is an object of the invention to improve wind turbines, particularly the yaw system and the reliability of the holding system of the yaw system in order reduce occurrences where the wind turbine nacelle forced out of its orientation. It is also an object of the invention to improve the energy production and to reduce instant loads and fatigue loads.

In a first aspect of the invention there is provided a method for monitoring yawing fault events of a yaw system of a wind turbine, the wind turbine comprises a tower, a nacelle and the yaw system which is arranged to provide yaw rotation of the nacelle in response to a yaw control signal, wherein the yaw system comprises one or more actuators for driving the yaw system and a holding system to resist yaw rotation, the method comprises monitoring a yaw angle of the yaw system,
comparing the yaw angle with the yaw control signal,
based on the comparison, determining a correlation between a monitored change in the yaw angle and the yaw control signal,
registering a yawing fault event dependent on the determined correlation between the yaw angle with the yaw control signal.

Advantageously, by registering yawing fault events, the health of the yaw system, specifically the holding system, can be monitored so that problems with the holding system can be detected in an early stage so that service and repair of the yawing system can be planned.

When using fixed service intervals, the yaw system may either be serviced too early, i.e. unnecessarily serviced, too late implying that unnecessary loss of energy production and/or mechanical loads.

By monitoring the occurrence of yawing faults, service can be performed immediately or possibly planned to take place later together with other service operations to reduce service costs. Thus, service of the yaw system may be planned, e.g. dependent on the number of accumulated yawing faults.

In this way, situations of unnecessary mechanical loads and unnecessary loss of energy production can be reduced by proper handling of the yaw fault.

The purpose of determining the correlation between a monitored change in the yaw angle and the yaw control signal is in general to determine if the change in the yaw angle was intended, i.e. generated in response to the control signal, or unintended, i.e. not generated in response to the control signal or not solely generated in response to the control signal. Thus, the correlation may involve determining a relationship between the yaw angle and the yaw control signal, or oppositely that there is no relationship or no strong relationship.

The yaw control signal may be any reference signal, error signal, controller output signal, or other control related signal such as yaw enabling/disabling signals required for enabling/disabling controlled yaw adjustments.

According to an embodiment, comparing the yaw angle with the yaw control signal comprises determining if a change in the yaw control signal has occurred within a time window located prior to the time of the monitored change in the yaw angle.

Advantageously, by checking if the control signal was not present within a given period of time, i.e. in the time window, this implies that the change of the yaw angle cannot be due to the control signal, but represents an undesired change of the yaw angle. In this case a yaw fault can be set. The length of the time window can be set e.g. dependent on the frequency of checking if a change of the yaw angle is required, e.g. so that the length of the time window is less that the time between checks of the yaw angle relative to the wind direction.

According to an embodiment, comparing the yaw angle with the yaw control signal comprises determining if a magnitude of the monitored change in the yaw angle is due to a corresponding change of the yaw control signal.

For example, the resulting change of the yaw angle may be too large or too small compared with the requested change, e.g. the yaw angle reference, i.e. where the yaw control signal requests a change, but the change is not in agreement with the control signal.

For example, the requested yaw change may be 1 degree, but the resulting yaw angle may have Increased to e.g. 1.5 degrees due to wind effects. This would require additional control efforts to bring the yaw angle back to the desired 1 degree.

Thus, even if the control signal was present in the time window prior to the time of the monitored change in the yaw angle, if the resulting change of the yaw angle does not match the change of the control signal, this could indicate the presence of a yaw fault event.

According to an embodiment, determining the correlation comprises determining if the change in the yaw angle is not generated in response to the yaw control signal. Thus, if the change in the yaw angle, either a part of the change or the entire change is not correlated with the control signal or is not due to the control signal, this may indicate the presence of a yawing fault. I.e. a fraction of the change of the yaw angle may be a response to the control signal, but the remaining change may not be a desired change corresponding with the control signal.

According to an embodiment, the method further comprises obtaining a wind condition valid for the time of the monitored change in the yaw angle, and registering the yawing fault event dependent on the comparison of the yaw angle with the yaw control signal and dependent on the wind condition.

The wind condition may be a wind speed, a wind direction, wind turbulence or other wind condition valid for the location of the wind turbine. Advantageously, by registering the yawing fault event dependent on the wind condition such as a wind speed, it is possible to disregard a yawing fault event, even if there is no correlation between the yaw angle and the yaw control signal. For example, this may be relevant in case of wind gusts at high wind speed where the holding system is configured to enable non-controlled yaw rotation to avoid large loads on the wind turbine.

According to an embodiment, the registering of the yawing fault event is dependent on a comparison of a wind speed value of the wind condition with a wind speed threshold. For example, if the wind speed is above the wind speed threshold when a yaw rotation is detected without a correlation with the control signal, no yawing fault is registered.

A second aspect of the invention relates to a control system for monitoring yawing fault events of a yaw system of a wind turbine (100), the wind turbine comprises a tower, a nacelle and a yaw system arranged to provide yaw rotation of the nacelle based on a yaw control signal, wherein the yaw system comprises one or more actuators for driving the yaw system and a holding system to resist yaw rotation, wherein the control system is arranged to perform the steps according to the method the first aspect.

A third aspect of the invention relates to a monitoring system for monitoring yawing fault events of a yaw system of a wind turbine, the wind turbine comprises a tower, a nacelle and a yaw system arranged to provide yaw rotation of the nacelle based on a yaw control signal, wherein the yaw system comprises one or more actuators for driving the yaw system and a holding system to resist yaw rotation, wherein the system comprises a data communication unit arranged to receive data, such as the yaw angle θm and the yaw control signal, and wherein the monitoring system is arranged to perform the steps according to the method of the first aspect.

The data communication unit may receive data from the wind turbines, central data processing units of a wind power plant, weather data processing unit or other data source unit. For example, the data communication unit may receive data in the form of yaw angle values and/or the yaw control signal values or data which relates to such values.

The monitoring system, which may be an external monitoring system, may comprise the control system of the second aspect and the data communication unit.

A fourth aspect of the invention relates to a wind turbine comprising a tower, a nacelle and a yaw system arranged to provide yaw rotation of the nacelle based on a yaw control signal, wherein the yaw system comprises one or more actuators for driving the yaw system and a holding system to resist yaw rotation, wherein the wind turbine is arranged to perform the steps according to the method of the first aspect.

A fifth aspect of the invention relates to a computer program product comprising instructions which, when the program is executed by a computer, cause the computer to carry out the steps of the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

Figure 1A:
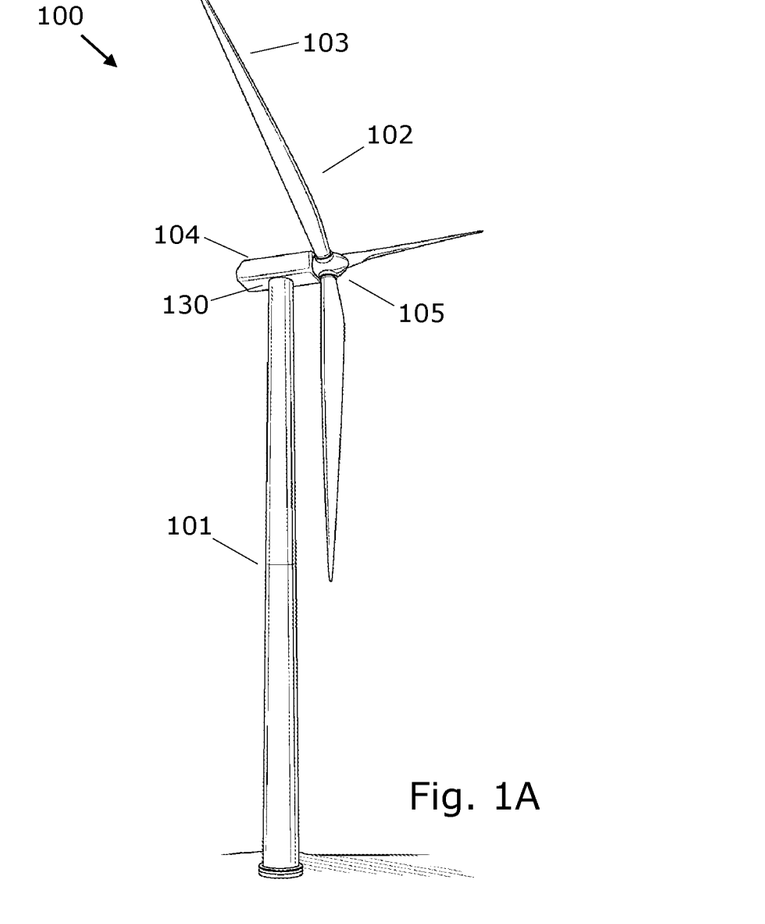
FIG. 1A shows a wind turbine.

FIG. 1A shows a wind turbine 100 (WTG) comprising a tower 101 and a rotor 102 with at least one rotor blade 103, such as three blades. The blades 103 are connected with the hub 105 which is arranged to rotate with the blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter, which comprises a generator side converter and a grid side converter. The generator side converter converts the generator AC power into DC power and the grid side converter converts the DC power into an AC power for injection into the utility grid via output inductors of the wind turbine 100.

The nacelle 104 is mounted on top of the tower 101 via a yaw system 130 (only indicated in FIG. 1A) arranged to enable rotation of the nacelle about a longitudinal axis of the tower 101.

Figure 1B:
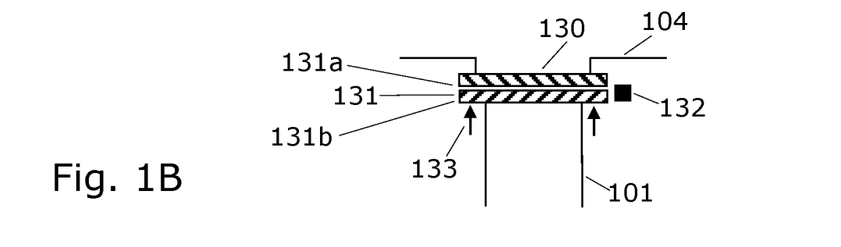
FIG. 1B shows a cross-sectional view of a yaw system.

FIG. 1B principally illustrates a cross-sectional view of a yaw system 130 with a yaw holding system 131 and yaw actuators 132.

A purpose of the yaw system is to rotate the nacelle 104 dependent on the wind direction so that the rotor 102 is oriented against the wind, i.e. so that the rotor plane is perpendicular or substantially perpendicular to the wind direction.

Rotation of the yaw system is achieved by use of one or more drive actuators 132 comprised by the yaw system 130 for driving the yaw system. The one or more drive actuators 132 (in short actuators 132) may comprise electric motors, hydraulic actuators or other.

An uneven wind distribution on the blade 103 in the rotor plane inevitably results in an uneven load distribution over the motor plane which results a yaw moment acting in a direction around the tower 101. The yaw system is configured to resist yaw rotation due to uneven wind distributions, at least for yaw moments below a given threshold.

Accordingly, the yaw system 130 is configured with a holding system 131 arranged to provide a holding moment to prevent yaw rotation or to prevent yaw rotation for yaw moments below a yaw moment threshold. Very high yaw moments could damage components of the wind turbine and therefore the yaw system 130 may be configured to provide yaw slippage for yaw moments above a given maximum yaw moment threshold.

Herein the moment which is exerted e.g. on the wind turbine or yaw system is understood to be equivalent with a torque. Similarly, the holding moment of the holding system 131 is understood to be equivalent with a holding torque.

The holding system 131 may be a passive or active friction brake or holding mechanism which may utilize friction contact between contact parts 131a, 131b of the yaw system 130 to provide the desired holding properties. For example, a contact force 133 established between brake parts of the yaw system—where relative motion or rotation is generated between the parts during yaw rotation—generates the holding moment necessary to resist yaw rotation. The contact force can be established by a system arranged to press the brake parts together, e.g. a passive system where the contact force is generated e.g. by compressed springs, or an active system where the contact force is generated by actuators such as hydraulic linear actuators which press the parts together when required. Specific examples of the brake of the holding system 131 comprise hydraulic yaw brakes, yaw friction bearings with passive or active brake friction systems and a yaw drive with a brake and clutch system, or a combination thereof. The holding system 131 need not be a separate system, i.e. a system which is separate from the drive system comprising the one or more actuators 132 and/or the yaw gear. That is, the holding system 131 may be comprised by such drive system, or a separate holding system (e.g. a friction brake) may be supplemented by another holding system comprised by the drive system. The yaw system need not be configured with a yaw friction bearing, but could be configured with a roller bearing instead.

In order that the contact force and holding moment are within desired limits, the system for providing the contact force may need to be serviced periodically or when the holding moment is outside the limits.

The holding system could also be configured as a motorized brake where the motor generated torque is controlled via the electric power supplied to the motor to generate the required holding moment.

In FIG. 1B the contact parts 131a, 131b of the yaw system 130 comprises flanges connected with the tower 101 and the nacelle 104, respectively, and arranged with adjacently arranged friction plane friction surfaces. The holding system could also be configured similarly to a disc brake of a card with hydraulic actuated brake pistons.

Clearly, the holding system may be configured as a combination of the above-mentioned examples or other holding systems.

Figure 2:
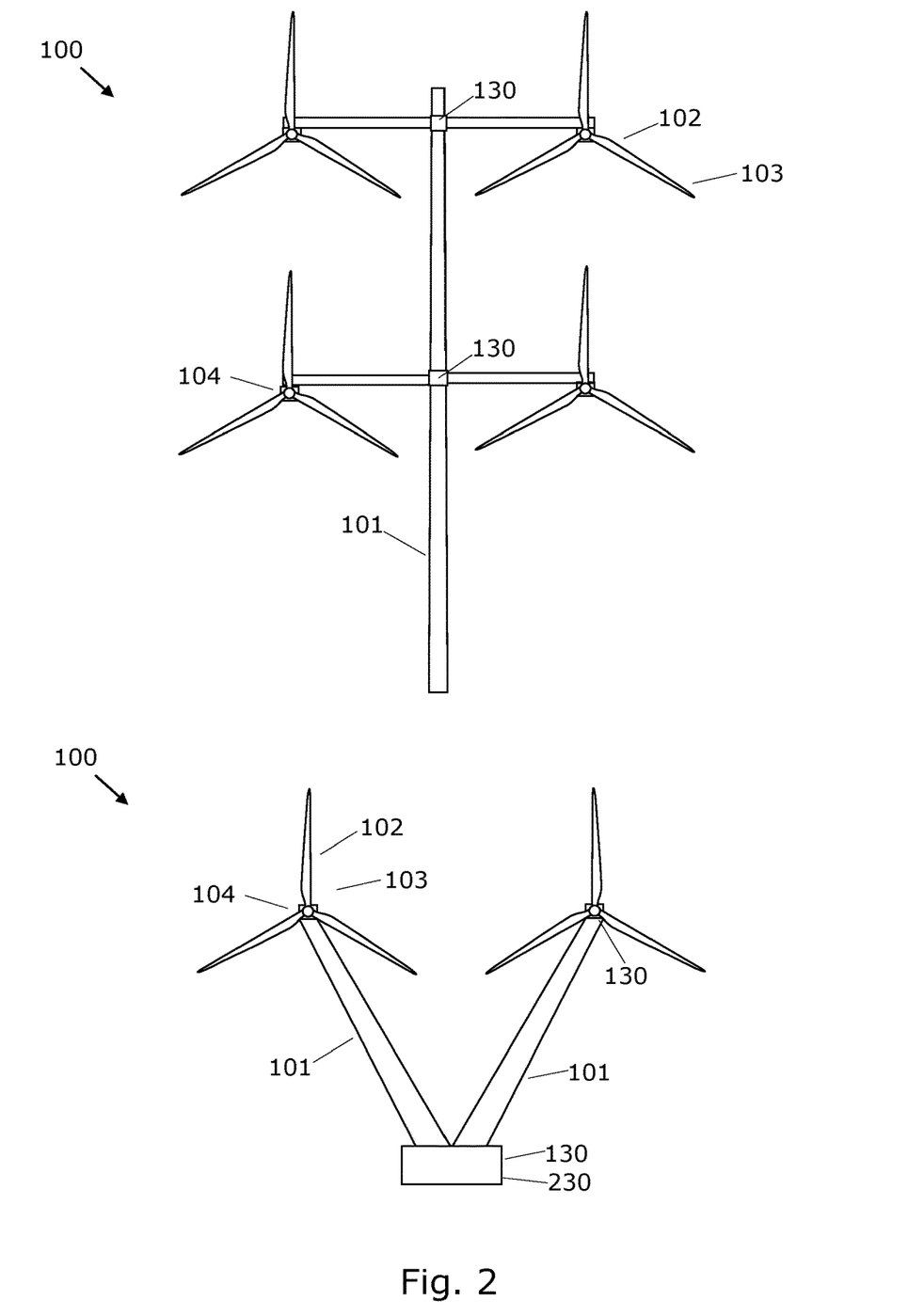
FIG. 2 shows a wind turbine configured as multi-rotor wind turbine.

FIG. 2 shows an alternative wind turbine 100 configured as multi-rotor wind turbine. Multi-rotor wind turbines comprises a plurality of nacelles 104. The nacelles 104 can be supported, as illustrated in the upper drawing, via a tower 101 and support arms extending outwardly from the tower 101 so that the nacelles are placed away from the tower and on opposite sides of the tower. Alternatively, as illustrated in the lower drawing, the nacelles 104 can be supported by angled towers 101 extending from a foundation 230, e.g. a ground or floating foundation, so that two or more nacelles 104 are sufficiently separated from each other at a given height. The multi-rotor wind turbine may be configured with similar yaw systems 130 as the wind turbine 100. For example, yaw systems 130 may be arranged for each of the nacelles. Alternative or additionally, a yaw system 130 may be arranged as a common yaw mechanism arranged between the tower and the support arms or between the foundation 230 and the angled towers 101. Embodiments of the present invention may be used with multi-rotor wind turbines or single-rotor wind turbines.

Figure 3A:
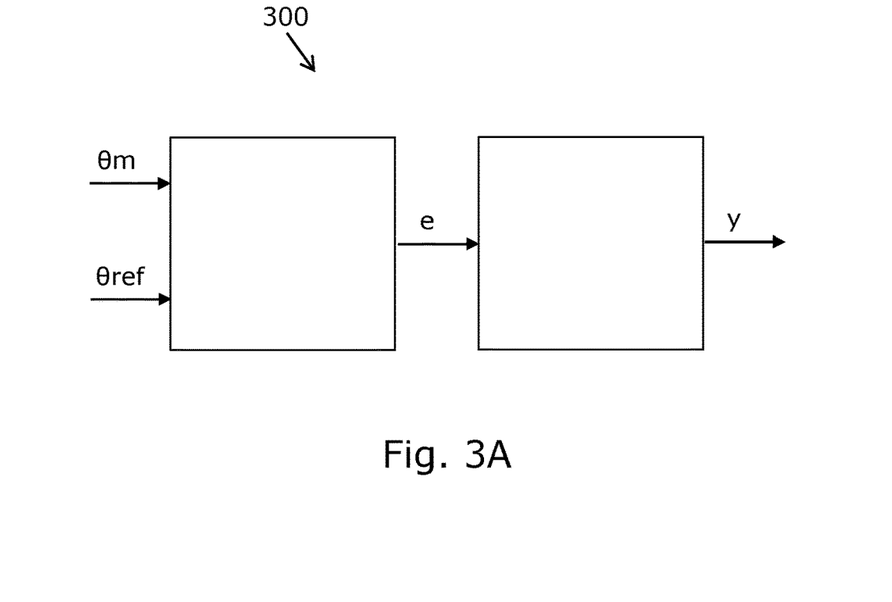
FIG. 3A shows a control system for controlling a yaw system.

FIG. 3A shows a possible control system 300 for controlling the yaw system 130 which is illustrated for the purpose of explaining embodiments of the invention. Other differently configured control systems providing the same or similar functionality also feasible for the purpose of controlling the yaw angle of the yaw system 130. The desired yaw angle θref and the monitored yaw angle θm are provided as input to the control system 300. The error e=θref-θm is determined and used for determining the yaw actuator signal y. The yaw actuator signal y is provided to the yaw system 130 which uses the yaw actuator signal y for controlling the yaw actuators 132. In case the yaw system uses active or motorized brakes, the control system may also determine a yaw brake signal for the brakes (not shown). The yaw actuator signal y is determined so that the controlled actuation of the yaw system minimizes the error e. The control of the yaw actuators based on the yaw actuator signal y may be performed continuously or periodically. When actuators are not controlled via the yaw actuator signal y, e.g. when the error e is below a certain threshold, the yaw angle is maintained by means of the holding system 131.

Figure 3B:
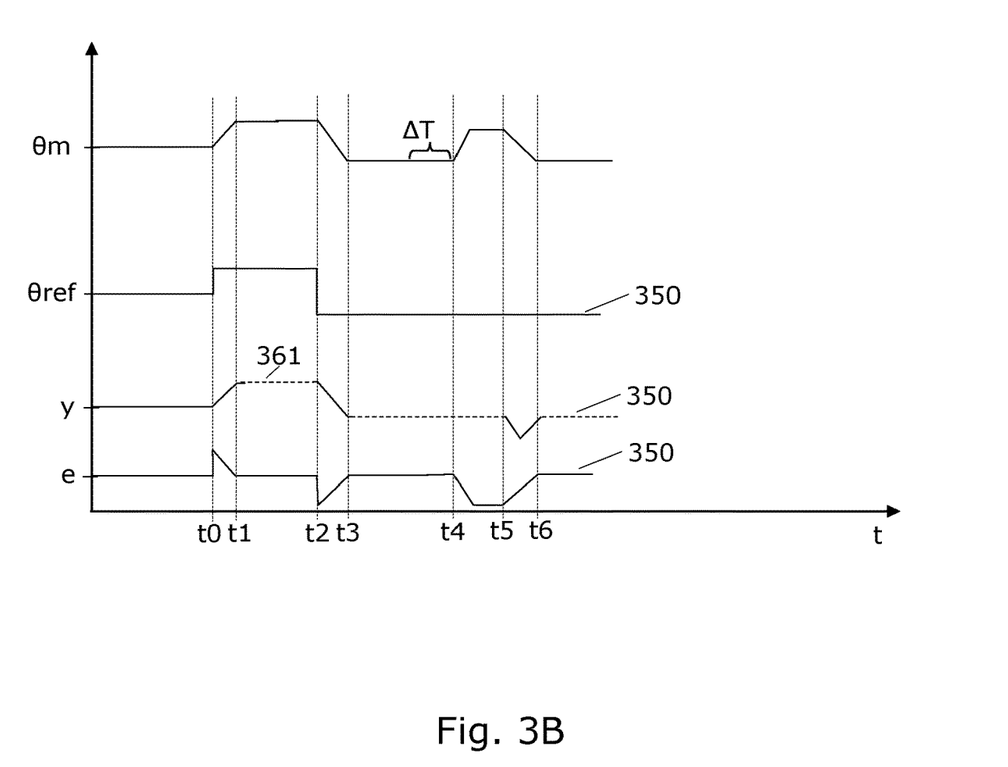
FIG. 3B shows an example of controlling the yaw angle in response to changes in the yaw reference.

FIG. 3B shows an example of controlling the yaw angle θm in response to changes in the yaw reference θref or equivalently in response to changes in the error e. FIG. 3B also shows an example of registering a yawing fault event dependent on a comparison of the determined yaw angle θm with the yaw control signal 351 such as the yaw actuator signal y or the yaw error signal e. All signals are illustrated as a function of time, are not in scale and are shown along the same ordinate axis despite their different units.

At t0, the reference signal θref increases to a new value. The change in the reference signal θref may be due to a change in the wind direction which requires a corresponding change in the yaw angle. The error signal e=θref−θm increases instantly and causes a change in the yaw actuator signal y which causes an increase of the monitored yaw angle θm. At t1 the monitored yaw angle θm has reached a level matching the yaw reference θref and the error signal e has returned to the zero-value.

Depending on the configuration of the yaw system 130, the yaw actuator signal y may be set to zero, may be unchanged or set to other non-active state 361 as indicated with the dotted line. The non-active state 361 of the actuator signal y means that adjustments of the yaw angle by use of the actuators 132 are practically disabled. During t1 to t2 or other period were the actuators are disabled the holding system 131 may be responsible for maintaining the yaw angle unchanged.

At t2, a new change in the reference signal θref is generated which results in a non-zero value of the error signal e. The actuator signal y changes, e.g. from the previous value before t2 or from other value to cause a change in the yaw angle θm. At t3 the desired value for the yaw angle θm has been reached.

At t4, there is no change of the yaw reference θref, but the yaw angle changes anyway as seen by the monitored yaw angle θm. This may be due to a wind gust which generates a moment exceeding the holding moment of the holding system 131. The error signal e shows a change due to the deviation between the yaw angel θm and the reference θref.

At t5, the control signal is determined based on the error signal e and therefore changes so as to bring the yaw signal θm back to the yaw reference θref. If not already enabled, the actuators 132 will be enabled, e.g. via an enabling signal, the value of the actuator signal y or in other ways. At t6 the rotor 102 has been rotated back to the desired yaw angle θm.

The change of the yaw angle θm which occurs without a change in the yaw reference θref is normally undesired since during the period where the nacelle 104 is forced from its upwind position to the nacelle is back in the upwind direction, there is a loss of energy production and there is a risk of mechanical overload of the load carrying components of the wind turbine 100 such as yaw gears and actuators 132. Such unintended change of the yaw angle θm is referred to as a yawing fault event.

In order to avoid or limit future occurrences of such undesired yaw misalignments, the yaw system 130 including its holding system 131 needs to be serviced. Embodiments of the present invention discloses yaw supervision methods enabling detection of yawing fault events so that service can be planned and relevant spare parts booked before service.

In the above examples, the actuator signal y is determined in response to the reference signal θref or the error signal e or in response to changes of the reference signal θref or the error signal e. Consequently, desired, i.e. planned, changes in the yaw angle θm occurs in response to a change of state, such as a change of a value, of the reference signal θref, the error signal e, the actuator signal y or other yaw control signal 350 of the yaw system 130 or the control system 300. Such other yaw control signal 350 can be any input signal, such as the reference θref, to the control system 300 or any signal generated in response to the input signal.

According to an embodiment, the method for monitoring yawing fault events the yaw angle θm of the yaw system is monitored. The yaw angle θm may be monitored by monitoring a sensor output which relates to the yaw angle. For example, an encoder or other position sensor may be arranged with a rotatable component of the yaw system 130 to measure the yaw angle θm.

The monitored yaw angle θm is compared with the yaw control signal 350 in order to determine if a change in the yaw angle is a response to the yaw control signal 350.

In order to avoid reactions to insignificant changes in the yaw angle θm, only changes of θm above a threshold may be considered.

Thus, if a change of the yaw angle θm is detected and there is no change in the yaw control signal 350, the change of the yaw angle is unintended and indicates a yawing fault event.

It is also possible, that a yaw angle θm is detected, but that the magnitude of the change of the yaw angle does not match the intended change of the yaw angle θm, i.e. where the change yaw angle θm does not correspond to the yaw control signal 350. For example, the change of the yaw angle θm may be smaller or greater than the intended change of the yaw angle θm. Such monitored changes of the yaw angle θm, which deviates from the intended change of the yaw angle may similarly indicate a yawing fault event.

Thus, the monitored yaw angle θm is compared with the yaw control signal 350 to determine a correlation between a monitored change in the yaw angle θm and the yaw control signal 350.

The correlation may comprise determining if the change in the yaw angle θm is not generated in response to the yaw control signal 350 and/or that the magnitude of the change of the yaw angle θm does not correspond with the intended magnitude of change of the yaw angle θm, i.e. does not correspond with the yaw angle which should have resulted from the yaw control signal 350 such as the reference θref.

For example, as illustrated in FIG. 3B, the unintended change in the yaw angle θm at t4 is not generated in response to the yaw control signal 350 since, within a time window ΔT located prior to the time t4 of the monitored change in the yaw angle, there was no change in the yaw control signal 350.

The yaw fault initiated at t4 in FIG. 3B results in an error signal, but the change of the error signal is initiated after the first change of the yaw angle θm at t4. Accordingly, there is no change in any of the actuator signal y, the error signal e, or the yaw reference θref in a time window ΔT prior to t4 indicating presence of a yawing fault event.

The length of the time window ΔT may be a few seconds, possible around one minute. The yaw system 130 may be configured so that any changes in the yaw reference θref or monitoring of the yaw angle θm occurs with a given control period. Thus, the time window ΔT may be selected to be less than the control period.

Dependent on the determined correlation between the yaw angle θm and the yaw control signal 350 a yawing fault event may be registered.

Figure 4A:
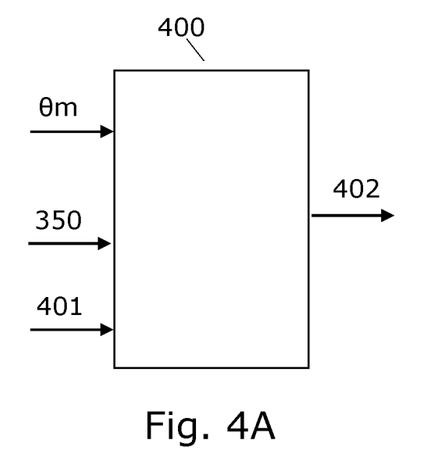
FIG. 4A shows a control system for monitoring the yawing fault events of a wind turbine based on the yaw angle.

FIG. 4A shows a control system 400 for monitoring the yawing fault events of a wind turbine 100 based on the yaw angle θm, the yaw control signal 350 and optionally a wind condition signal 401 provided to the control system 400 via inputs. The yawing fault event may be registered by the control system 400 and made available via the output 402. The control system 400 is configured to perform method steps of the various embodiments described herein, e.g. by means of a digital processor comprised by the control system and a computer program. Thus, based on the inputs, the control system 400 may be configured to compare the yaw angle θm with the yaw control signal 350, determining the correlation between a monitored change in the yaw angle θm and the yaw control signal 350 based on the comparison, and determining a yawing fault event dependent based on the determined correlation.

The control system 400 may be comprised by the wind turbine 100 or a system external to the wind turbine.

Figure 4B:
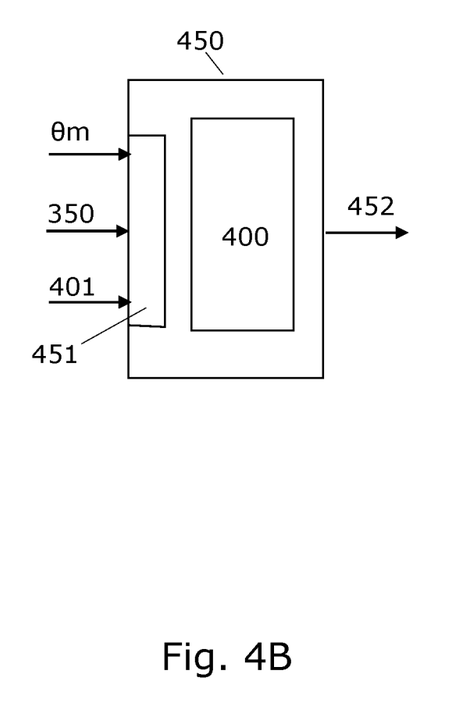
FIG. 4B shows an external monitoring system for monitoring yawing fault events of a wind turbine.

FIG. 4B shows such external control system 400 in the form of a monitoring system 450 for monitoring yawing fault events of a wind turbine 100. The monitoring system 450 receives the data necessary for determining if a yawing fault event is present based on received data such as the yaw angle θm, the yaw control signal 350, and optionally a wind condition signal 401. The monitoring system 450 may comprise a data communication unit 451 arranged to receive data such as the above-mentioned data, e.g. via a wired or wireless connection. The data may be provided from the one or more wind turbines 100. For example, yaw angle θm and yaw control signals 350 may be provided from the one or more wind turbines, whereas the wind condition data 401 may be provided from another system such as a wind monitoring system. Similarly, the yaw reference θref may be provided from others systems than the wind turbines. The monitoring system 450 is arranged to perform the same method steps as the control system and may therefore comprise the control system 400 or a digital processor arranged perform method steps of the embodiments described herein. A yawing fault event may be registered by the monitoring system 450 and made available via an output 452.

As explained above, for high yaw moments above a given maximum yaw moment threshold, the yaw system 130 may be configured to provide yaw slippage in order to prevent potentially damaging yaw moments. Such high yaw moments may be generated under special wind conditions, e.g. at high wind speeds or for turbulent winds.

In order to avoid registering a fault event where yaw slippage is intended, the control system 400 may be arranged to obtain a wind condition 401 via an input. The wind condition 401 may be provided regularly so that the wind condition valid for the time of the monitored change in the yaw angle or for the determination of a potential yawing fault event is available. The registering of the yawing fault event may then be determined dependent on the comparison of the yaw angle θm with the yaw control signal 350 and dependent on the wind condition 401. For example, the control system 400 may be configured to register a yawing fault event dependent on a comparison of a wind speed value of the wind condition 401 with a wind speed threshold, so that a potential yawing fault event is not registered as a yawing fault event if the actual wind speed value is above the wind speed threshold.

Figure 5:
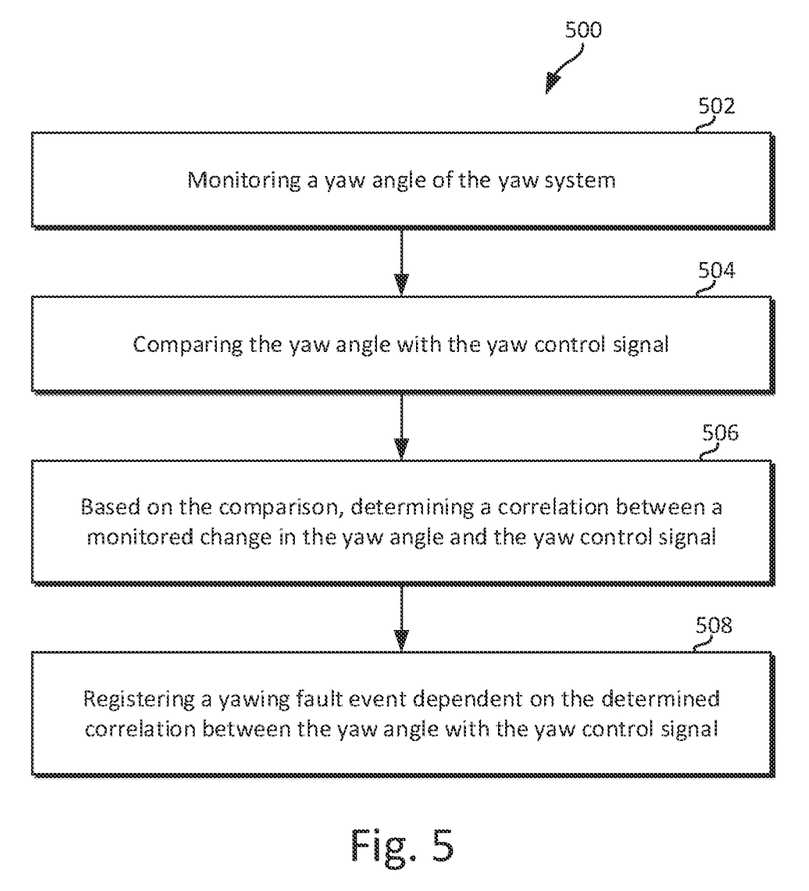
FIG. 5 is a flow diagram for a method of monitoring yawing fault events of a yaw system of a wind turbine.

FIG. 5 is a flow diagram for a method 500 of monitoring yawing fault events of a yaw system of a wind turbine. In some implementations, a monitoring or control system can implement the method 500. At 502, the method 500 includes monitoring a yaw angle of the yaw system. At 504, the method 500 includes comparing the yaw angle with the yaw control signal. At 506, the method 500 includes, based on the comparison, determining a correlation between a monitored change in the yaw angle and the yaw control signal. At 508, the method 500 includes registering a yawing fault event dependent on the determined correlation between the yaw angle with the yaw control signal.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for monitoring yawing fault events, the method comprising:
   providing a wind turbine comprising a tower, a nacelle, and a yaw system, the yaw system being arranged to provide yaw rotation of the nacelle relative to the tower in response to a yaw control signal, wherein the yaw system comprises one or more actuators for driving the yaw system and a holding system to resist yaw rotation;
   monitoring a yaw angle of the yaw system;
   comparing the yaw angle with the yaw control signal;
   based on the comparison, determining a correlation between a monitored change in the yaw angle and the yaw control signal to determine whether the monitored change in the yaw angle was unintended: i) by not being generated in response to the yaw control signal; or ii) when a magnitude of the monitored change in the yaw angle is not due to a corresponding change of the yaw control signal;
   registering a yawing fault event when the determined correlation between the monitored change in the yaw angle and the yaw control signal indicates that the change in the yaw angle was unintended; and servicing the yaw system based on a number of accumulated registered fault events.

2. The method of claim 1, wherein comparing the yaw angle with the yaw control signal comprises determining if a change in the yaw control signal has occurred prior to the time of the monitored change in the yaw angle.

3. The method of claim 1, wherein comparing the yaw angle with the yaw control signal comprises determining if the magnitude of the monitored change in the yaw angle is due to the corresponding change of the yaw control signal.

4. The method of claim 1, wherein determining the correlation comprises determining if the monitored change in the yaw angle is not generated in response to the yaw control signal.

5. The method of claim 1, further comprising:
   obtaining a wind condition valid for the time of the monitored change in the yaw angle; and
   registering the yawing fault event dependent on the wind condition.

6. The method of claim 5, wherein the registering of the yawing fault event is dependent on a comparison of a wind speed value of the wind condition with a wind speed threshold.

7. The method of claim 1, further comprising:
   booking spare parts prior to the servicing.

8. A control system for monitoring yawing fault events, wherein the control system is arranged to perform an operation, comprising:
   providing a wind turbine comprising a tower, a nacelle, and a yaw system, the yaw system being arranged to provide yaw rotation of the nacelle relative to the tower in response to a yaw control signal, wherein the yaw system comprises one or more actuators for driving the yaw system and a holding system to resist yaw rotation;
   monitoring a yaw angle of the yaw system;
   comparing the yaw angle with the yaw control signal, wherein comparing the yaw angle with the yaw control signal comprises determining if a change in the yaw control signal has occurred prior to the time of the monitored change in the yaw angle;
   based on the comparison, determining a correlation between a monitored change in the yaw angle and the yaw control signal;
   registering a yawing fault event dependent on the determined correlation between the monitored change in the yaw angle and the yaw control signal; and servicing the yaw system based on a number of accumulated registered fault events.

9. A monitoring system for monitoring yawing fault events, wherein the monitoring system comprises:
   a data communication unit arranged to receive data, including a yaw angle and a yaw control signal, and wherein the monitoring system is arranged to perform an operation, comprising:

providing a wind turbine comprising a tower, a nacelle, and a yaw system, the yaw system being arranged to provide yaw rotation of the nacelle relative to the tower in response to the yaw control signal, wherein the yaw system comprises one or more actuators for driving the yaw system and a holding system to resist yaw rotation;

monitoring the yaw angle of the yaw system;

comparing the yaw angle with the yaw control signal, wherein comparing the yaw angle with the yaw control signal comprises determining if a magnitude of the monitored change in the yaw angle is due to a corresponding change of the yaw control signal;

based on the comparison, determining a correlation between a monitored change in the yaw angle and the yaw control signal;

registering a yawing fault event dependent on the determined correlation between the monitored change in the yaw angle and the yaw control signal; and servicing the yaw system based on a number of accumulated registered fault events.

10. A computer program product comprising a non-transitory computer readable medium storing instructions which, when the instructions are executed by a computer, cause the computer to perform an operation, the operation comprising:

providing a wind turbine comprising a tower, a nacelle, and a yaw system, the yaw system being arranged to provide yaw rotation of the nacelle relative to the tower in response to a yaw control signal, wherein the yaw system comprises one or more actuators for driving the yaw system and a holding system to resist yaw rotation;

monitoring a yaw angle of the yaw system;

comparing the yaw angle with the yaw control signal;

based on the comparison, determining a correlation between a monitored change in the yaw angle and the yaw control signal, wherein determining the correlation comprises determining if the monitored change in the yaw angle is not generated in response to the yaw control signal;

registering a yawing fault event dependent on the determined correlation between the monitored change in the yaw angle and the yaw control signal; and servicing the yaw system based on a number of accumulated registered fault events.

11. A wind turbine, comprising:

a tower;

a nacelle;

a yaw system comprising one or more actuators for driving the yaw system and a holding system to resist yaw rotation, the yaw system arranged to provide yaw rotation of the nacelle based on a yaw control signal; and a control system configured to perform an operation, comprising:

monitoring a yaw angle of the yaw system;

comparing the yaw angle with the yaw control signal;

based on the comparison, determining a correlation between a monitored change in the yaw angle and the yaw control signal, wherein determining the correlation comprises determining if the monitored change in the yaw angle is not generated in response to the yaw control signal;

registering a yawing fault event dependent on the determined correlation between the monitored change in the yaw angle and the yaw control signal; and servicing the yaw system based on a number of accumulated registered fault events.

* * * * *